(12) United States Patent
Flumeri et al.

(10) Patent No.: US 12,179,837 B2
(45) Date of Patent: Dec. 31, 2024

(54) CONTROL METHOD FOR A ROAD VEHICLE WITH INDEPENDENT ENGINES ACTING ON THE WHEELS OF THE SAME AXLE AND RELATIVE ROAD VEHICLE

(71) Applicant: FERRARI S.p.A., Modena (IT)

(72) Inventors: Alessandro Flumeri, Modena (IT); Francesca Mincigrucci, Modena (IT)

(73) Assignee: FERRARI S.P.A., Modena (IT)

( * ) Notice: Subject to any disclaimer, the term of this patent is extended or adjusted under 35 U.S.C. 154(b) by 288 days.

(21) Appl. No.: 17/831,501

(22) Filed: Jun. 3, 2022

(65) Prior Publication Data

US 2022/0396312 A1 Dec. 15, 2022

(30) Foreign Application Priority Data

Jun. 10, 2021 (IT) .......................... 102021000015206

(51) Int. Cl.
*B62D 15/02* (2006.01)
*B60W 40/09* (2012.01)
*B60W 40/114* (2012.01)

(52) U.S. Cl.
CPC ......... *B62D 15/0235* (2013.01); *B60W 40/09* (2013.01); *B60W 40/114* (2013.01); *B60W 2510/205* (2013.01); *B60W 2520/10* (2013.01); *B60W 2520/266* (2013.01)

(58) Field of Classification Search
CPC . B62D 15/0235; B60W 40/09; B60W 40/114; B60W 2510/205; B60W 2520/10; B60W 2520/266
USPC .......................................................... 701/41
See application file for complete search history.

(56) References Cited

U.S. PATENT DOCUMENTS

| 9,421,883 B2 * | 8/2016 | Drako .................... B60L 15/025 |
| 9,469,214 B2 * | 10/2016 | Wright ............ B60W 30/18172 |
| 2012/0109458 A1 * | 5/2012 | Sidlosky ............. B60T 8/17551 |
| | | 701/41 |

(Continued)

FOREIGN PATENT DOCUMENTS

| CA | 3111180 A1 * | 9/2021 | ........... B28C 5/4217 |
| CN | 111806420 A * | 10/2020 | ............... B60K 1/02 |

(Continued)

OTHER PUBLICATIONS

Sorniotti, et al.; Optimization of a multi-speed electric axle as a function of the electric motor properties; Sep. 1, 2010; IEEE; 2010 IEEE Vehicle Power and Propulsion Conference; pp. 2-4 (https://ieeexplore.ieee.org/document/5729120) (Year: 2010).*

(Continued)

*Primary Examiner* — Atul Trivedi
(74) *Attorney, Agent, or Firm* — CANTOR COLBURN LLP

(57) ABSTRACT

A method to control a road vehicle driven by a driver and provided with at least a first drive wheel and a second driver wheel belonging to a same axle, each drive wheel being independently operated by a respective first and second electric motor; the control method comprises the step of controlling the torque delivered by each respective motor to the first drive wheel or to the second drive wheel as a function of a torque requested by the driver and independently of the difference in angular speed between the first and the second wheel.

13 Claims, 4 Drawing Sheets

(56) References Cited

U.S. PATENT DOCUMENTS

| | | | |
|---|---|---|---|
| 2012/0221209 A1* | 8/2012 | Tatsukawa | B60W 10/184 |
| | | | 701/42 |
| 2016/0236589 A1* | 8/2016 | Sikand | B60L 15/2036 |
| 2017/0307058 A1* | 10/2017 | Chu | F16H 48/36 |
| 2019/0128396 A1* | 5/2019 | Chu | B62D 11/10 |
| 2019/0176801 A1* | 6/2019 | Ruybal | B60K 6/52 |
| 2019/0217709 A1* | 7/2019 | Zhao | B60T 8/172 |
| 2019/0275994 A1* | 9/2019 | Zhao | B60T 1/10 |
| 2019/0351895 A1* | 11/2019 | Ben-Ari | B60K 6/26 |
| 2020/0164868 A1* | 5/2020 | Suetake | B60W 30/02 |
| 2020/0189599 A1* | 6/2020 | Ota | B60W 30/18172 |
| 2020/0398844 A1* | 12/2020 | Ruybal | B60W 10/08 |
| 2021/0152105 A1* | 5/2021 | Froelich | B60K 17/34 |
| 2021/0354682 A1* | 11/2021 | Takaira | B60W 10/08 |
| 2021/0380111 A1* | 12/2021 | Tabata | B60K 6/547 |
| 2021/0402877 A1* | 12/2021 | Velazquez Alcantar | |
| | | | B60W 30/18181 |
| 2021/0402982 A1* | 12/2021 | Verbridge | B60W 40/114 |
| 2022/0111895 A1* | 4/2022 | Schumann | B62D 15/025 |
| 2022/0194378 A1* | 6/2022 | Sullivan | B60L 7/24 |
| 2023/0286494 A1* | 9/2023 | Park | B60W 10/08 |

FOREIGN PATENT DOCUMENTS

| | | | | |
|---|---|---|---|---|
| CN | 114559925 A * | 5/2022 | | B60W 20/00 |
| CN | 115465114 A * | 12/2022 | | B60L 15/20 |
| DE | 102020109720 A1 * | 10/2020 | | B60W 10/02 |
| DE | 102021215060 A1 * | 12/2022 | | B60K 17/354 |
| EP | 3153382 A1 | 4/2017 | | |
| EP | 3741636 A1 * | 11/2020 | | B60L 15/20 |
| FR | 2916717 A3 * | 12/2008 | | B60W 10/184 |
| GB | 2255057 A * | 10/1992 | | B60K 23/0808 |
| GB | 2280157 A * | 1/1995 | | B60K 23/04 |
| GB | 2580392 A * | 7/2020 | | B60T 1/005 |
| WO | 2015146445 A1 | 10/2015 | | |
| WO | WO-2020015885 A1 * | 1/2020 | | B60K 1/02 |
| WO | WO-2019174716 A9 * | 2/2020 | | B60T 1/005 |

OTHER PUBLICATIONS

Munusamy, et al.; "Design of rear wheel torque vectoring for dual motor Electric drive system," 2014 Ninth International Conference on Ecological Vehicles and Renewable Energies (EVER), Monte-Carlo, Monaco, 2014, pp. 1-20, doi: 10.1109/EVER.2014.6844114. (https://ieeexplore.ieee.org/document/6844114) (Year: 2014).*
Search Report for Italian Application No. 102021000015206, completed Mar. 1, 2022, 9 pages.

* cited by examiner

CONTROL METHOD FOR A ROAD VEHICLE WITH INDEPENDENT ENGINES ACTING ON THE WHEELS OF THE SAME AXLE AND RELATIVE ROAD VEHICLE

CROSS-REFERENCE TO RELATED APPLICATIONS

This patent application claims priority from Italian patent application no. 102021000015206 filed on Jun. 10, 2021, the entire disclosure of which is incorporated herein by reference.

TECHNICAL FIELD

The invention relates to a method to control a road vehicle with independent motors acting upon wheels of a same axle and to a relative road vehicle.

PRIOR ART

Self-locking differentials are known, which are configured to change torque distribution so as to encourage the transmission of power to the wheel rotating more slowly (avoiding stalls or slips due, for example, to the lifting of a wheel or to the slip thereof on a surface with a reduced friction, for example a wet surface). These devices generally comprise a clutch system configured to limit the torque transmitted to the drive wheel rotating more quickly, to the advantage of the one rotating more slowly.

Furthermore, in recent years, in order to increase vehicle stability, safety or performances, different types of electronically controlled self-locking differentials have been developed.

Patent application WO2004087453A1 discloses a road vehicle provided with an electronically controlled self-locking differential, whose percentage of locking is controlled by a control unit in order to try and stabilize (namely, make more stable and, hence, safe) the road vehicle.

According to patent application WO2004087453A1, while driving along a bend, the electronic control unit progressively increases the percentage of locking of the self-locking differential (namely, it "closes" the clutch of the self-locking differential in order to transfer a greater quantity of torque to the drive wheel rotating more slowly, namely to the wheel on the inside of the bend) in case of release of the accelerator pedal to stabilize the road vehicle.

According to patent application WO2004087453A1, while driving along a bend, the control unit progressively decreases the percentage of locking of the self-locking differential (namely, it "opens" the clutch of the self-locking differential in order to transfer a greater quantity of torque to the drive wheel rotating more quickly, namely to the wheel on the outside of the bend) in case of pressing of the accelerator pedal to improve both the stability of the road vehicle and the acceleration performances along the bend; in particular, the reduction in the percentage of locking of the self-locking differential is proportional to the lateral acceleration of the road vehicle, to the driving speed of the road vehicle, to the torque delivered by the engine and/or the gear engaged in the transmission.

According to patent application WO2004087453A1, while driving along a bend at a substantially constant speed, the control unit estimates the state of grip of the drive wheels to the road surface and consequently cancels the percentage of locking of the self-locking differential, when the state of grip of the drive wheels to the road surface is far from the grip limit, progressively increases the percentage of locking of the self-locking differential, when the state of grip of the drive wheels to the road surface gets close to the grip limit, and finally reduces the percentage of locking of the self-locking differential up to the zero value, when the state of grip of the drive wheels to the road surface is very close to the grip limit.

Document WO2015146445A1 describes a device to control the activation of a motor, which is capable of reducing the rattling noise of the gears generated in a speed reduction gear without increasing the dimensions of the speed reduction gear and the number of components.

With advent of electric cars, the concept of differential was maintained even in those cases in which there are different motors, for example one for the front axles and one for the rear axle. In some cases, furthermore, in case the drive wheels of a same axle are operated by different actuators, software was implemented in order to imitate the behaviour of an electronically controlled self-locking differential.

All examples discusses above, for they use a physical differential, either an electronically controlled one or a software-simulated one, determine or define a bond between the difference of angular speed of the drive wheels belonging to the same axis. In particular, these bonds cause a lack of optimization in terms of performances (part of the torque is anyway transmitted to the wheel with a greater angular speed) or comfort, further avoiding the possibility of opposing possible undesired yaws due to adverse conditions of the ground or generated by the failure of an actuator.

DESCRIPTION OF THE INVENTION

The object of the invention is to provide a method to control a road vehicle with independent motors acting upon wheels of a same axle and to a relative road vehicle, said control method not suffering from the drawbacks described above, being easy and economic to be implemented and, in particular, being capable of maximizing performances while driving on a track, without making the road vehicle unstable.

According to the invention there are provided a method to control a road vehicle with independent motors acting upon wheels of a same axle as well as a relative road vehicle, according to the appended claims.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
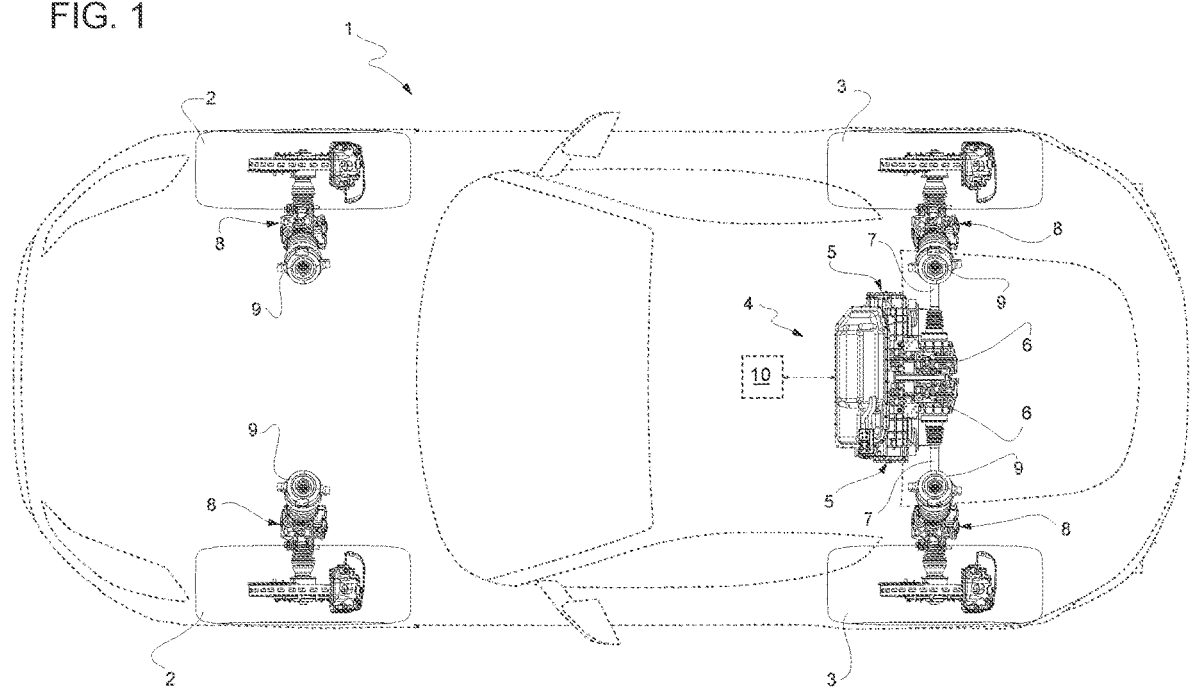
FIG. 1 is a schematic plan view of a road vehicle provided with two separate and independent motors, which are controlled according to the invention.

In FIG. 1, number 1 indicates, as a whole, a road vehicle provided with two front wheels 2 and two rear drive wheels 3 (hence, belonging to a same axle, namely the rear one), which receive the torque from a powertrain system 4.

The powertrain system 4 comprises at least two electric motors 5, each independently operating a respective drive wheel 3. The electric motors 5 are preferably arranged in a transversely central, longitudinal rear position. Each one of said electric motors 5 is mechanically connected (by means of reduction or transmission elements 6) to the respective wheel 3 through a respective axle shaft 7, which is integral to a respective rear drive wheel 3.

In some non-limiting cases which are not shown herein, each drive wheel 3 is independently operated by a respective axle shaft 7. In particular, the control method comprises the step of controlling the torque $T_L$, $T_R$ delivered to each respective axle shaft towards the first drive wheel 3 or towards the second drive wheel 3 as a function of a torque requested by the driver and independently of the difference in angular speed between the first and second wheel 3. More precisely, the torque delivered to the axle shafts 7 can be delivered by one single (combustion or electric) actuator of the powertrain system 4.

Each wheel 2 or 3 is mechanically connected to a frame of the road vehicle 1 by means of a suspension 8 (partially shown in FIG. 1), which is provided with an electronically controlled shock absorber 9, namely provided with an electric actuator, which can change (namely, increase or decrease) the damping of the electronically controlled shock absorber 9. By way of example, the electric actuator of each electronically controlled shock absorber 9 could comprise one or more solenoid valves, which modulate the dimension of the holes for the passage of oil inside the electronically controlled shock absorber 9, or it could comprise a magnetic-rheological fluid, which changes its physical properties depending on an applied magnetic field.

The road vehicle 1 comprises an electronic control unit 10 ("ECU"), which, among other things, adjusts the behaviour of the road vehicle 1 both while it drives along a straight road and while it drives along a bend by acting, as described more in detail below, upon the torque delivered by the electric motors 5 to the drive wheels 3 and, if necessary, in collaboration with the shock absorbers 9 of the suspensions 8. The control unit 10 can physically consist of one single device or of several devices separate from one another and communicating with one another through the CAN network of the road vehicle 1.

In known vehicles, as mentioned above, an electronically controlled self-locking differential is present or simulated. In these devices, when the locking clutch is completely open (namely, the percentage of locking is zero), the self-locking differential is completely free and the torque is equally divided between the two rear drive wheels (namely, each rear drive wheel receives 50% of the total torque, regardless of its rotation speed); on the contrary, by closing the locking clutch (namely, by increasing the percentage of locking), the self-locking differential starts locking and the torque delivered to the rear drive wheel rotating more slowly is progressively increased (namely, the rear drive wheel rotating more slowly receives more torque than the rear drive wheels rotating more quickly). In these devices, the difference in the torque that can be delivered to each drive wheel is a function of the difference in the angular speed of the drive wheels. Furthermore, the differential tends to re-establish the aforesaid balance in the division of the torque between the two drive wheels, hence forbidding a differentiation in the torque delivered to the two drive wheels in case the drive wheels have the same angular rotation speed.

On the contrary, according to the control method described below, the control unit 10, in particular a controller CTR on the inside of the latter, is configured to control the torque delivered by each electric motor 5 to the respective drive wheel 3 as a function of a torque Cin requested by the driver (for example, through an accelerator pedal) and independently of the angular speed difference between the drive wheels 3. In this way, for example based on a driving mode selected by the driver in order to prefer "performances" or "ease of driving", the torque delivered by the motors 5 to the wheels 3 can be differentiated irrespective of the angular speed conditions of the drive wheels 3. In particular, thanks to the elimination of the aforesaid bond between the difference in angular speed and the difference in torque delivered to the wheels 3, it is possible to improve the maintenance of a straight trajectory on a bumpy or non-flat road.

Figure 2:
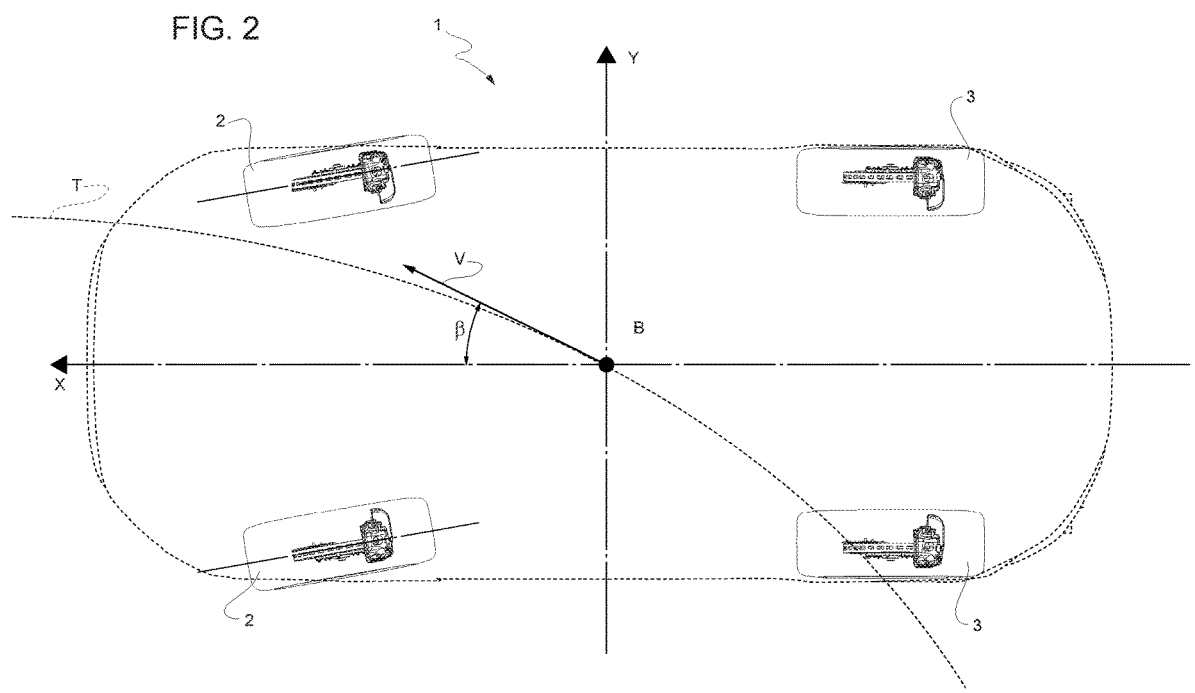
FIG. 2 is a schematic view of the road vehicle of FIG. 1 while driving along a bend, highlighting the trajectory, the driving speed and the attitude angle.

According to FIG. 2, when driving along a bend, the control unit 10 determines, in a known manner, the variation $\beta'$ of an attitude angle $\beta$ of the road vehicle 1 (namely, the angle comprised between the longitudinal axis x of the road vehicle 1 and the direction of the driving speed V of the road vehicle 1 in the centre of gravity B). It should be pointed out that the attitude angle $\beta$ is different from the yaw angle (namely, the angle comprised between the longitudinal axis x of the road vehicle 1 and a fixed ground reference), since the road vehicle 1 can assume the same yaw angle in the plane, though assuming very different attitude angles $\beta$ and vice versa.

In particular, the control unit 10 determines the variation $\beta'$ of the attitude angle $\beta$ and calculates the torque to be delivered to each drive wheel 3 as a function of the variation $\beta'$ of the attitude angle.

Figure 3:
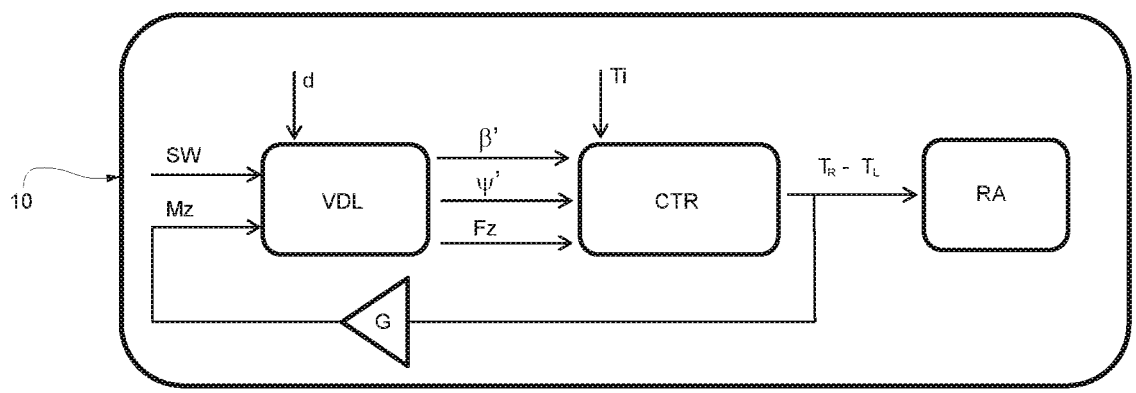
FIG. 3 is a schematic diagram showing the logic structure of a control according to the invention.
Figure 4:
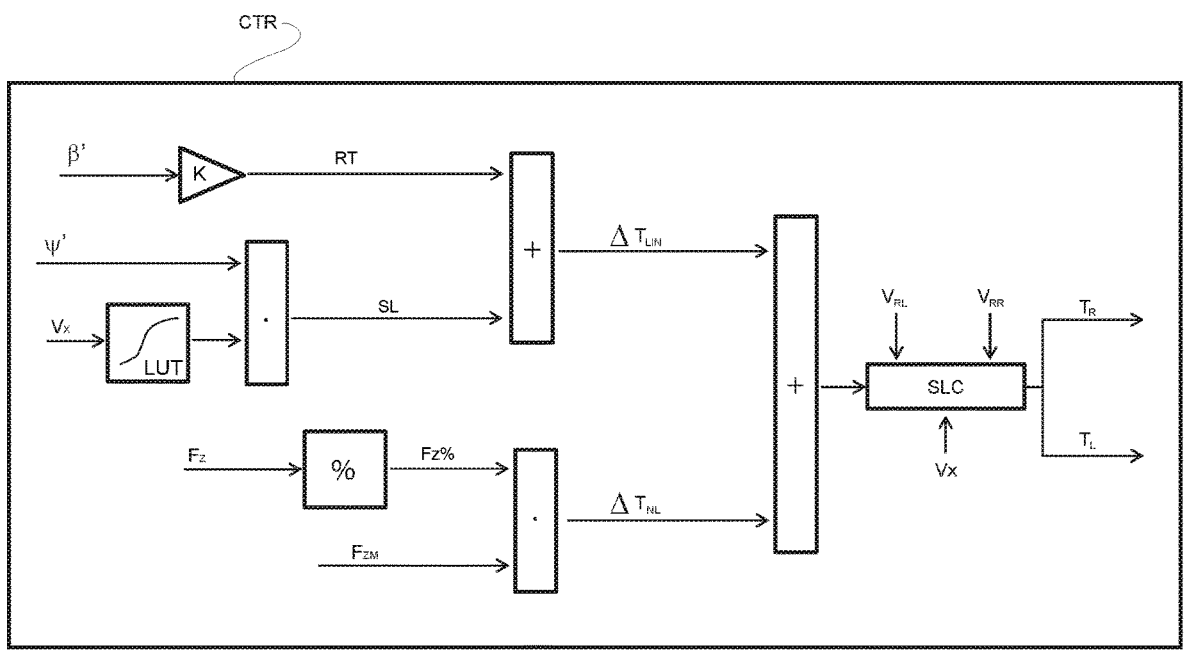
FIG. 4 shows a schematic diagram showing the structure of a controller shown in FIG. 3.

According to the preferred embodiment shown in FIGS. 3 and 4, the control unit 10 detects, in particular by means of one or more inertial measuring units (which are known and, hence, are not described in detail), the yaw rate $\psi'$ of the road vehicle 1. Preferably, the controller CTR calculates the torque $T_R$, $T_L$ delivered by each motor 5 to the respective drive wheel 3 as a function of the yaw rate $\psi'$.

Advantageously, though not necessarily, the variation $\beta'$ of the attitude angle $\beta$ is calculated without using a numerical derivative of the attitude angle $\beta$ of the vehicle, but is calculated through a non-linear combination of yaw rate $\psi'$, lateral acceleration (detected or determined by means of known models of the road vehicle 1) and linear speed Vx of the vehicle 1. In this way, it is possible to avoid the occurrence of those approximations that would naturally be necessary in calculating the variation $\beta'$ of the attitude angle $\beta$ deriving the attitude angle $\beta$ itself in time.

According to the preferred, though non-limiting embodiments of FIGS. 3 and 4, the control unit 10 detects, by means of known methods (measured with suitable sensors or estimated through modelling of the road vehicle 1), the vertical forces Fz acting upon the drive wheels 3, in particular the rear ones. In this way, the controller CTR calculates the torque $T_R$, $T_L$ delivered by each motor 5 to the respective drive wheel 3 as a function of the distribution Fz % of the vertical forces between the drive wheels 3 (see, for example, FIG. 4).

Advantageously, though not necessarily, the control unit 10, in particular the controller CTR, limits (by means of a suitable slip control SLC) the delivery of the torque $T_R$, $T_L$ from each motor 5 to the respective drive wheel 3 in case a target delivery (resulting from the sum of a yawing contribution $\Delta T_{NL}$ and an adverse-yawing contribution $\Delta T_{LIN}$, as described more in detail below) exceeds a limit determined by the grip of a respective tyre installed on one of the drive wheels 3. In particular, said limit is calculated according to known techniques as a function of the properties of the tyre, of the longitudinal speed Vx of the vehicle 1 and of the angular speeds VRR and VRL of the right drive wheel 3 and of the left drive wheel 3, respectively (FIG. 4). In this way, the advantages deriving from the presence of a differential (namely, preventing a wheel from excessively rotating in the absence of grip) can be maintained, though without delivering torque to the other drive wheel and without necessarily tending to equally divide the torque.

As mentioned above, advantageously, though not necessarily, the controller CTR processes the torque $T_R$, $T_L$ to be delivered to each drive wheel (right and left wheel, respectively) by adding the (in particular, linear) yawing contribution $\Delta T_{NL}$ and the (in particular, non-linear) adverse-yawing contribution $\Delta T_{LIN}$ to one another. In particular, the yawing contribution $\Delta T_{NL}$ and the adverse-yawing contribution $\Delta T_{LIN}$ each indicate a torque difference between the two drive wheels 3 belonging to the same (rear) axle RA. More precisely, the yawing contribution $\Delta T_{NL}$ and the adverse-yawing contribution $\Delta T_{LIN}$ are values in Nm that indicate, of a total input torque $F_{ZM}$ of the rear axle, what difference there has to be in the delivery of torque between the right drive wheel 3 and the left drive wheel 3.

Advantageously, though not necessarily, the adverse-yawing contribution $\Delta T_{LIN}$ is calculated (by the controller CTR) as a function of the variation β ' of the attitude angle β of the road vehicle 1, of the yaw rate ψ' and of the longitudinal speed Vx of the road vehicle (1) itself.

In particular, the adverse-yawing contribution $\Delta T_{LIN}$ results from the sum of a contribution RT based on the variation β' of the attitude angle β and of a contribution SL based on the yaw rate ψ'. More precisely, the contribution RT provides an adverse-yawing contribution to the final control output, which counters more sudden trajectory variations. These variations are typically caused by a road input disturbance d or by transient dynamics, both linear and non-liner ones. In other words, the contribution RT relates to the area of the dynamics behaviour of the road vehicle 1 concerning straightness and transients.

On the other hand, the contribution SL based on the yaw rate ψ' provides an adverse-yawing contribution to the final output useful to modulate a lateral stationary response of the road vehicle 1 relative to steering inputs (SW) provided by the driver. Therefore, by means of this control, the steering wheel torque perceived by the driver can be changed, as well. When modulating (calibrating) the lateral stationary response of the vehicle, the multiplying coefficient of the yaw rate ψ' depends on the longitudinal speed Vx and depends on the requests of the driver by means of the table LUT (lookup table).

Advantageously, though not necessarily, the yawing contribution $\Delta T_{NL}$ is calculated (by the controller CTR) as a function of the lateral dynamics VDL of the vehicle (FIG. 3), which, in turn, is a function of the difference $T_R-T_L$ in the torque delivered by each respective motor 5 to the same axle RA, preferably by means of a geometric relation function of track width of said axle RA and radius of the drive wheels 3.

In particular, the relation between $T_R-T_L$ and $M_Z$ is preferably determined, in an unequivocal manner, by the equations of the dynamics of the vehicle (namely, not by the controller CTR). In detail, said relation translates itself into a multiplying gain resulting from car track width t and wheel radius R, wherein $M_Z=0.5*(T_R-T_L)/R*t$.

In particular, the yawing contribution $\Delta T_{NL}$ results from the product between the distribution $F_Z$ % of the vertical forces between the drive wheels 3 and the total input torque $F_{ZM}$ of the rear axle. In detail, the distribution $F_Z$ % of the vertical forces between the drive wheels 3 indicates the percentage of vertical force acting upon the right and left drive wheels 3 relative to the total force acting upon the rear axle RA. Block % indicated in FIG. 4 indicates a simple percentage calculation, in which the vertical forces of each drive wheel 3 are divided by the total of the forces $F_Z$ acting upon the axle RA. More precisely, the torque $F_{ZM}$ is controlled by the driver by means of a suitable pedal and substantially corresponds to an input torque Ti (FIG. 3), namely the request for driving or braking torque provided based on the condition of at least one pedal (for example, accelerator pedal). In this way, even though this request for torque by the driver has to be met, it can freely be split between the drive wheels 3 based on the vehicle conditions, without having to be subjected to limits due to the speed difference between the drive wheels of prior art systems.

In some non-limiting cases, the control unit 10 is configured to control the torque $T_R$ delivered by the respective motor 5 to the right drive wheel 3 so as to compensate for a possible failure of the motor 5 acting upon the left drive wheel 3 and vice versa.

Advantageously, though not necessarily, alternatively or in addition, the control unit 10 is configured to monitor one or more actuators other than the motors 5 (for example the suspensions 8, in particular the shock absorbers 9) and to control the torques $T_R$, $T_L$ delivered to the right drive wheel 3 and/or the left drive wheel 3 so as to compensate for possible failures of said one or more actuators, so as to maintain the target trajectory T of the road vehicle 1.

According to a non-limiting embodiment, the control unit 10 estimates the trajectory T followed by the road vehicle 1 using the measures provided in real time by a triple-axis gyroscope and by a GPS tracking unit; in particular, the trajectory T is determined by integrating twice in time the accelerations measured by the triple-axis gyroscope and the measures provided by the GPS tracking unit are used to cyclically cancel the position errors occurring during the integration process. Furthermore, the control unit 10 estimates the driving speed V of the road vehicle 1 in the centre of gravity B using the measures provided in real time by the triple-axis gyroscope; in particular, the speed V of the road vehicle 1 in the centre of gravity B is determined by integrating once in time the accelerations measured by the triple-axis gyroscope (making sure that the driving speed V of the road vehicle 1 in the centre of gravity B actually is tangent to the trajectory T followed by the road vehicle 1, otherwise, in case of a significant deviation, at least one further iteration of the calculation is carried out making corrections to the parameters used).

While driving along a bend, the control unit 10 determines in real time (for example, as described below) the variation β' of the actual (real) attitude angle β of the road vehicle 1.

According to a possible (though non-binding) embodiment, the control unit 10 cyclically estimates (for example, with a frequency of at least some dozens of Hz and in a known manner) a grip of the wheels 2 and 3 to the road surface, determines a radius of curvature of the trajectory T of the road vehicle 1 (namely, determines a curvature degree of the trajectory T) and determines the driving speed V of the road vehicle 1. As a function of the grip of the wheels 2 and 3 (hence, of the stability of the road vehicle 1), of the radius of curvature of the trajectory T and of the driving speed V, the control unit 10 cyclically determines the variation β' of the attitude angle.

The control unit 10 detects or calculates the speed β' of variation of the attitude angle β and changes the torque delivered to the drive wheels 3 by the respective electric motors 5.

In the non-limiting embodiment of FIG. 3, the control unit 10 process a model VDL of the lateral dynamics of the road vehicle 1, in particular as a function of steering inputs SW provided by the driver (for example, angle and derivatives thereof in time) and of a yawing moment Mz, which is directly proportional (by means of a proportionality factor G) to the difference $T_R-T_L$ in the torque delivered by the electric motors 5. In particular, the proportionality factor G takes into account the aforesaid geometric relation function of the rear track width and of the radius of the drive wheels 3. Furthermore, in order to calculate the lateral dynamic of the road vehicle 1, a disturbance d concerning road conditions is also taken into account, according to known algorithms.

Following the processing of the model VDL, the control unit 10 sends to the controller CTR a plurality of inputs, among which there are:
- the variation β' of the attitude angle β, namely the derivative of the attitude angle β calculated, as indicated above, from a non-linear combination of lateral acceleration, yaw rate ψ' and speed V (all signals that are available from known sensors on board the road vehicle 1);
- the yaw rate ψ', namely the car yaw speed (available from a known inertial platform);
- the vertical forces Fz acting upon the drive wheels 3, in particular upon the rear wheels (measured with suitable sensors or estimated through car modelling).

Furthermore, the controller CTR is provided with the input torque Ti, namely the request for driving or braking torque provided based on the condition of at least one pedal (for example, accelerator pedal).

The controller CTR provides, as an output towards the motors 5 of the motorized (rear) axle RA, the torques $T_R$, $T_L$ to be delivered, sending their difference $T_R-T_L$ to the proportionality factor G.

FIG. 4 shows, in the form of a diagram, a preferred, though non-limiting embodiment of the structure of the controller CTR.

In particular, as mentioned above, the final output of the control (before the check of the slip control SLC) is calculated as the sum of the contributions handling each area of dynamic behaviour of the car (yawing and adverse-yawing contributions).

To sum up, the total torque $F_{ZM}$ requested (or Ti), thanks to the control described so far, is divided between the torques $T_R$ and $T_L$ directed to the drive wheels 3 without bonds due to the difference in the angular speed thereof.

Furthermore, there is provided a calibration of the controller CTR processing the right gains, thresholds, loading tables, etc. (for example, K for β or the lookup table LUT for Vx or in the slip control SCL), so as to pursue target car dynamics, which maximize know performance indicators (lap time on track) and driving pleasure. This calibration allows, in each moment and based on the conditions of the car, the more important contribution $\Delta T_{NL}$, $\Delta T_{LIN}$ to prevail.

The control method described above has different advantages.

First of all, the advantage relative to a system with a mechanical differential lies in the removal of the bond between torques and angular speed of the wheels of the same axle.

Furthermore, the aforesaid method maintains the stabilizing ability of a mechanical differential with a limited slip, exploiting, at the same time, the potentialities offered by the freedom to freely deliver different torques to the drive wheels, even in conditions in which they have the same angular speed (which is not possible with known systems).

In addition, the control described above easily maintains a straight trajectory, even on a bumpy or inclined road, as well as manages, for example as a function of the position of a hand lever or based on the driver's requests, the yawing and adverse-jawing contributions, so as to favour, for example, the first one, in case performances are the target, or the second one, in case a simplified driving of the car is the target.

Moreover, the control method described above is particularly safe, for it counters a yaw that is undesired by the driver and is caused by possible failures detected in other actuators, promptly and effectively intervening in case of need.

Finally, the control method described above is simple and economic to be implemented in a road vehicle provided 1 with a motor for each drive wheel, since it does not require the addition of any physical component (in fact, the differentials can be removed, thus facilitating the maintenance and the flexibility of the vehicle 1), and can completely be carried out via software. It should be pointed out that the control method described above does not use either a high computing ability or a large memory space and, therefore, it can be implemented in a control unit with no need for updates or boosts.

LIST OF THE REFERENCE NUMBERS OF THE FIGURES

1 road vehicle
2 front wheels
3 rear wheels
4 powertrain system
5 electric motors
6 reduction gear
7 axle shaft
8 suspension
9 shock absorber
10 control unit
B centre of gravity
CTR controller
d disturbance
FZ vertical forces
FZ % distribution of the vertical forces
FZM total input torque of the rear axle
G proportionality factor
K gain
LUT lookup table
MZ yawing moment
RA rear axle
RT contribution
SL contribution
SLC slip control
SW steering angle
T trajectory
Ti input torque
TL left wheel torque
TR right wheel torque
Vx longitudinal speed x longitudinal axis
y lateral axis
β attitude angle
β' variation of the attitude angle
ΔTLIN adverse-yawing contribution
ΔTNL yawing contribution
ψ' yaw rate

The invention claimed is:

1. Control method for a road vehicle (1) driven by a driver and provided with at least a first driving wheel (3) and a second drive wheel (3) belonging to an axle (RA), each drive wheel (3) being operated independently by a respective first and second half-shaft (7);

the control method comprises controlling the torque ($T_L$, $T_R$) delivered to each respective first and second half-shaft (7) towards the first drive wheel (3) with a first motor (5) mechanically coupled to the first shaft (7) or towards the second drive wheel (3) with a second motor (5) mechanically coupled to the second shaft (7) as a function of a torque requested by the driver and independently of the difference in angular velocity between the first and second drive wheel (3).

2. The method according to claim 1, and comprising the further step of determining the variation (B') of an attitude angle (B) of the road vehicle (1), namely the angle (B) between the longitudinal axis (x) of the road vehicle (1) and the direction of the velocity (V) of progress of the road vehicle (1) at the center of gravity (B), wherein the torque ($T_L$, $T_R$) delivered by each respective engine (5) towards the first or second drive wheel (3) is calculated as a function of the variation (B') of the angle (B) of attitude.

3. The method according to claim 2, wherein the variation (β') of the attitude angle (β) is calculated without resorting to a numerical derivative of the attitude angle (β) of the vehicle (1); in particular by means of a non-linear combination of yaw rate (ψ"), lateral acceleration and linear velocity (Vx) of the vehicle (1).

4. The method according to claim 1, and comprising the further step of detecting, by means of at least one inertial measurement unit, a velocity (ψ") of yaw of the road vehicle (1), wherein the torque ($T_L$, $T_R$) delivered by each respective motor (5) towards the first or second driving wheel (3) is calculated as a function of the velocity (ψ") of yaw.

5. The method according to claim 1, and comprising the further step of detecting the vertical forces ($F_Z$) acting on the drive wheels (3), in particular rear wheels, measured with appropriate sensors or estimated by modeling the road vehicle (1); wherein the torque ($T_L$, $T_R$) delivered by each respective motor (5) towards the first or second driving wheel (3) is calculated as a function of the distribution ($F_Z$ %) of the vertical forces between the driving wheels.

6. The method according to claim 1, and comprising the further step of limiting the torque output ($T_L$, $T_R$) from each respective engine (5) to the first or second drive wheel (3) if a desired output exceeds a limit determined by the grip of a respective tire installed on the first or second drive wheel (3).

7. The method according to claim 1, wherein the torque (TL, TR) to be delivered to the first and second drive wheels (3) comprises the sum of a contribution (ATLIN) and a yawing contribution (ATNL).

8. The method according to claim 7, wherein the adverse-yawing contribution ($\Delta T_{LIN}$) is calculated as a function of the variation (β') of an attitude angle (β) of the road vehicle (1), the yawing speed (ψ") and the longitudinal speed ($V_X$) of the road vehicle (1) itself.

9. The method according to claim 7, wherein the yawing contribution ($\Delta T_{NL}$) is calculated as a function of the difference ($T_R$-$T_L$) of torque delivered by each respective motor (5) of the same axle (RA); in particular according to a geometric relation function of track width of said axle (RA) and radius of the first and second drive wheels (3).

10. The method according to claim 1, wherein the control is carried out on the first and second wheels (3) of a rear axle (RA) of the road vehicle (1).

11. The method according to claim 1, further comprising controlling the torque ($T_L$, $T_R$) delivered by the first motor (5) towards the first drive wheel (3) so as to compensate for any failure of the second motor (5) acting on the second drive wheel (3) and vice versa.

12. The method according to claim 1 and comprising the further steps of monitoring one or more actuators (8, 9) other than the first and second motors (5) and the step of controlling the torques ($T_L$, $T_R$) delivered towards the first and/or to the second driving wheel (3) so as to compensate for any failure of the one or more actuators (8, 9) while maintaining a desired trajectory (T) of the road vehicle (1).

13. Road vehicle (1) comprising:
   at least one first drive wheel (3) and one second drive wheel (3) belonging to the same axle (RA);
   at least one first and one second electric motor (5) configured to respectively and independently drive the first and second drive wheels (3);
   the vehicle (1) comprising a control unit (10) configured to control the torque ($T_L$, $T_R$) delivered towards the first electric motor (5) and the second electric motor (5) by performing the method according to claim 1.

* * * * *